US012172629B2

(12) United States Patent
Assaliyski et al.

(10) Patent No.: US 12,172,629 B2
(45) Date of Patent: Dec. 24, 2024

(54) VEHICLE AND CORRESPONDING POWERTRAIN CONTROL SYSTEM

(71) Applicant: FORD GLOBAL TECHNOLOGIES, LLC, Dearborn, MI (US)

(72) Inventors: Marin Assaliyski, Dearborn, MI (US); Corey James Blue, Belleville, MI (US); Samuel Melville Glauber, McLean, VA (US); Bradley D Riedle, Norhville, MI (US); Timothy Baxendale, Portales, NM (US)

(73) Assignee: Ford Global Technologies, LLC, Dearborn, MI (US)

( * ) Notice: Subject to any disclaimer, the term of this patent is extended or adjusted under 35 U.S.C. 154(b) by 55 days.

(21) Appl. No.: 18/312,022

(22) Filed: May 4, 2023

(65) Prior Publication Data

US 2024/0367638 A1     Nov. 7, 2024

(51) Int. Cl.
*B60W 20/40*     (2016.01)
*B60W 10/02*     (2006.01)
*B60W 10/06*     (2006.01)
*B60W 10/08*     (2006.01)

(52) U.S. Cl.
CPC ............ *B60W 20/40* (2013.01); *B60W 10/02* (2013.01); *B60W 10/06* (2013.01); *B60W 10/08* (2013.01); *B60W 2510/0208* (2013.01); *B60W 2540/10* (2013.01); *B60W 2710/021* (2013.01); *B60W 2710/06* (2013.01)

(58) Field of Classification Search
CPC ...... B60W 10/02; B60W 10/06; B60W 10/08; B60W 20/40; B60W 2050/0014; B60W 2050/0062; B60W 2510/0208; B60W 2540/10; B60W 2710/021; F16D 2500/50236; F16D 2500/70605; F16D 48/08

See application file for complete search history.

(56) References Cited

U.S. PATENT DOCUMENTS

| | | | |
|---|---|---|---|
| 6,658,341 B2 | 12/2003 | Inoue et al. | |
| 9,108,614 B2 | 8/2015 | Doering et al. | |
| 9,527,505 B1 | 12/2016 | Gibson et al. | |
| 11,035,461 B2 | 6/2021 | Kim | |
| 2014/0222273 A1 | 8/2014 | Banker et al. | |
| 2018/0050609 A1* | 2/2018 | Meyer | B60W 10/08 |
| 2019/0136920 A1 | 5/2019 | Kim | |
| 2020/0309256 A1 | 10/2020 | Kim | |
| 2022/0309845 A1* | 9/2022 | Shui | B60W 30/188 |

FOREIGN PATENT DOCUMENTS

| | | |
|---|---|---|
| EP | 3101300 A1 | 12/2016 |
| JP | 2003205768 A | 7/2003 |
| KR | 20170001892 A | 1/2017 |
| KR | 101755797 B1 | 7/2017 |

\* cited by examiner

*Primary Examiner* — Timothy Hannon
(74) *Attorney, Agent, or Firm* — Vincent Mastrogiacomo; Brooks Kushman P.C

(57) ABSTRACT

A vehicle includes an engine, an electric machine, a disconnect clutch, a starter motor, and a controller. The engine and electric machine are each configured to generate power to propel the vehicle. The disconnect clutch is disposed between the engine and the electric machine. The controller is programmed to, in response to a command to start the engine, operate either the disconnect clutch or the starter motor to start the engine based on a level of adaptive learning of previous disconnect clutch engagements.

20 Claims, 2 Drawing Sheets

VEHICLE AND CORRESPONDING POWERTRAIN CONTROL SYSTEM

TECHNICAL FIELD

The present disclosure relates to vehicles and corresponding powertrain control systems.

BACKGROUND

Vehicles may include powertrain control systems that are configured control the power output of the vehicle powertrain.

SUMMARY

A vehicle includes an engine, an electric machine, a disconnect clutch and a controller. The engine and electric machine are each configured to generate power to propel the vehicle. The disconnect clutch is disposed between the engine and the electric machine. The controller is programmed to, in response to (i) a command to start the engine and (ii) a first level of adaptive learning of previous disconnect clutch engagements, close the disconnect clutch to start the engine under non-stroked and zero torque conditions of the disconnect clutch. The controller is further programmed to, in response to (i) the command to start the engine and (ii) a second level of adaptive learning of previous disconnect clutch engagements that is greater than the first level, close the disconnect clutch to start the engine under (a) the non-stroked and zero torque conditions of the disconnect clutch and (b) stroked and zero torque conditions of the disconnect clutch.

A vehicle includes an engine, an electric machine, a disconnect clutch, a starter motor, and a controller. The engine and the electric machine are each configured to generate power to propel the vehicle. The disconnect clutch is disposed between the engine and the electric machine. The starter motor is configured to start the engine. The controller is programmed to, in response to commands to start the engine during a first period of operation, (i) close the disconnect clutch to start the engine under a first set of conditions and (ii) operate the starter motor to start the engine under a second set of conditions. The controller is further programmed to, in response to commands to start the engine during a second period of operation occurring after the first period of operation, (i) close the disconnect clutch to start the engine under the first set of conditions and a portion of the second set of conditions and (ii) operate the starter motor to start the engine under a remainder of the second set of conditions. The controller is further programmed to, in response to commands to start the engine during a third period of operation occurring after the second period of operation, close the disconnect clutch to start the engine under the first set of conditions and the second of conditions.

A vehicle includes a powertrain, a disconnect clutch, a starter motor, and a controller. The powertrain has an engine and an electric machine that are each configured to generate power to propel the vehicle. The disconnect clutch is (i) disposed between the engine and the electric machine, (ii) configured to open to disconnect the engine from a remainder of the powertrain, and (iii) configured to close to connect the engine to the remainder of the powertrain. The starter motor is configured to start the engine. The controller is programmed to, in response to (i) a command to start the engine and (ii) a first level of adaptive learning of previous disconnect clutch engagements, (a) close the disconnect clutch to start the engine under non-stroked and zero torque conditions of the disconnect clutch, and (b) operate the starter motor to start the engine under (I) stroked and zero torque conditions of the disconnect clutch, (II) non-stroked and non-zero torque conditions of the disconnect clutch, and (III) stroked and non-zero torque conditions of the disconnect clutch. The controller is further programmed to, in response to (i) the command to start the engine and (ii) a second level of adaptive learning of previous disconnect clutch engagements that is greater than the first level, (a) close the disconnect clutch to start the engine under (I) the non-stroked and zero torque conditions of the disconnect clutch and (II) the stroked and zero torque conditions of the disconnect clutch, and (b) operate the starter motor to start the engine under (I) the non-stroked and non-zero torque conditions of the disconnect clutch and (II) the stroked and non-zero torque conditions of the disconnect clutch. The controller is further programmed to, in response to (i) the command to start the engine and (ii) a third level of adaptive learning of previous disconnect clutch engagements that is greater than the second level, (a) close the disconnect clutch to start the engine under (I) the non-stroked and zero torque conditions of the disconnect clutch, (II) the stroked and zero torque conditions of the disconnect clutch, (III) a portion of the non-stroked and non-zero torque conditions of the disconnect clutch, and (IV) a portion of the stroked and non-zero torque conditions of the disconnect clutch, and (b) operate the starter motor to start the engine under (I) a remainder of the non-stroked and non-zero torque conditions of the disconnect clutch and (II) a remainder of the stroked and non-zero torque conditions of the disconnect clutch. The controller is further programmed to, in response to (i) the command to start the engine and (ii) a fourth level of adaptive learning of previous disconnect clutch engagements that is greater than the third level, close the disconnect clutch to start the engine under (I) the non-stroked and zero torque conditions of the disconnect clutch, (II) the stroked and zero torque conditions of the disconnect clutch, (III) the non-stroked and non-zero torque conditions of the disconnect clutch, and (IV) the stroked and non-zero torque conditions of the disconnect clutch.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
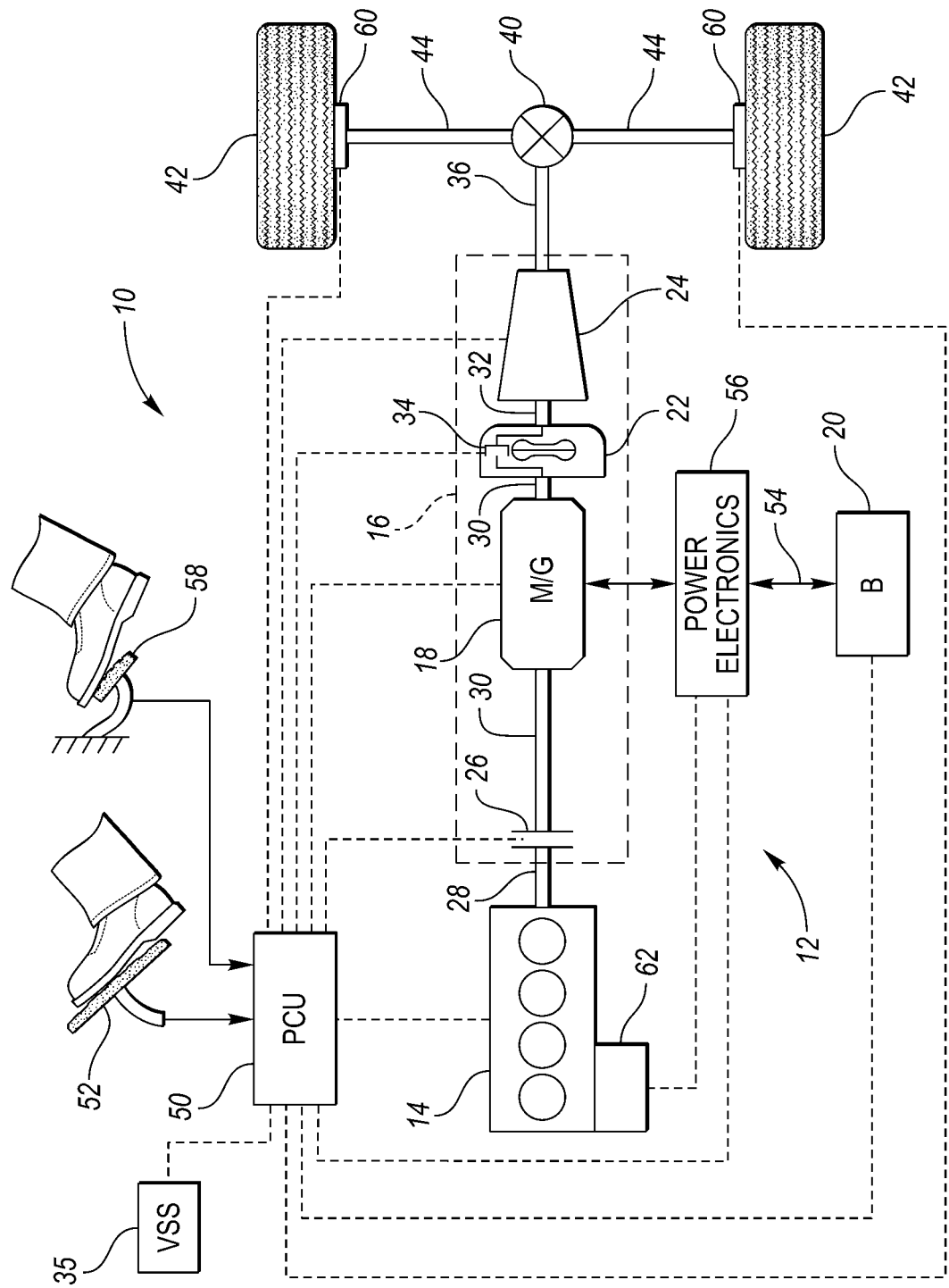
FIG. 1 is a schematic illustration of an exemplary powertrain of a hybrid vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 and the M/G 18 may each be referred to as powerplants that are configured to generate power to propel the vehicle 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example. M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example. The wheels 42 may be referred to as drive wheels that are driven by the powerplants (e.g., engine 14 and M/G 18) of the vehicle 10 via power that is transferred from the powerplants, through the subcomponents of the powertrain (e.g., torque converter 22, gearbox 24, shaft 36, differential 40, half shafts 44, etc.) to the drive wheels 42.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc.

Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS) 35, coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component amount or presence, intake air flow (MAF), transmission gear, ratio, or mode, transmission oil temperature (TOT), transmission turbine speed (TS), torque converter bypass clutch 34 status (TCC), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for case of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

The disconnect clutch 26 may be utilized to transferred torque from the M/G 18 to the engine 14 to crank the engine 14 (e.g., turn the crankshaft 28) during an engine start. More specifically, the disconnect clutch 26 may be closed to transfer torque from the M/G 18 to the engine 14 during an engine start. An additional starter motor 62 may also be provided to start the crank the engine 14 during engine starts. The starter motor 62 may draw power from a battery (e.g., a 12V battery) other than traction battery 20 that has a lower voltage than traction battery 20.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28 and/or the M/G 18 may be provided between the torque converter 22 and the gearbox 24. Other configurations are contemplated without deviating from the scope of the present disclosure.

It should be understood that the vehicle configuration described herein is merely exemplary and is not intended to be limited. Other hybrid vehicle configurations should be construed as disclosed herein. Other vehicle configurations may include, but are not limited to, series hybrid vehicles, parallel hybrid vehicles, series-parallel hybrid vehicles, or any other vehicle configuration known to a person of ordinary skill in the art.

During the engine start and connect process, the disconnect clutch 26 torque capacity is controlled to crank and/or connect the engine 14 with a modulated pressure/torque capacity profile. Boost duration can affect apply drive feel. To counteract this boost-driven apply feel, adaption procedures may be used to learn the appropriate boost time duration for a given apply condition, boosted stated, or stroked state. The appropriate boost time duration may be applied during subsequent engagements of the disconnect clutch 26.

Boost duration may refer to a boosting time period where an increased hydraulic pressure is applied to the disconnect clutch 26 to advance the opposing sides of the disconnect clutch 26 to a stroke point. The stroke point is where torque starts to transfer through the disconnect clutch 26 (e.g., the point where the torque increases from zero if the disconnect clutch 26 is further advanced and the opposing sides further engage). The stroke point may correspond to a position where the opposing sides of the disconnect clutch 26 initially come into contact or where torque begins to transfer hydrodynamically through the fluid between the opposing sides or disks of the disconnect clutch 26 before actual engagement between opposing sides of the disconnect clutch 26 occurs. More specifically, the hydraulic pressure applied to the disconnect clutch 26 may be a hydraulic pressure applied to a piston that forces the opposing sides of the disconnect clutch 26 into contact with each other. The disconnect clutch 26 being in a condition where the opposing sides of the disconnect clutch 26 have not come into contact or where torque has not begun to transfer hydrodynamically may be referred to as an non-stroked condition of the disconnect clutch 26. The disconnect clutch being at the stoked point, may be referred to as a stroked condition of the disconnect clutch 26.

Open-loop boosting may enhance the speed of response on engagement of the disconnect clutch 26. Higher torque demand engagements of the disconnect clutch 26 may be more sensitive to the effects of incorrect boost duration. Allowing the utilization of clutch apply profiles initially without any adaptation may affect drivability. Even if the boost duration is correct, the stroke points of the disconnect clutch 26 may also need to be adjusted to ensure smooth engagements of the disconnect clutch 26 that do not interfere with drivability.

The engine 14 may be started under various conditions and scenarios. For example, the engine 14 may be started while the disconnect clutch 26 is either in the stroked condition (e.g., at the stoke point) or the non-stroked condition. As another example, the engine 14 may be started under zero and non-zero torque conditions of the disconnect clutch 26. A zero torque condition of the disconnect clutch 26 may referred to a condition where there is no current torque demand or where zero torque is being delivered to the drive wheels 42 (e.g., there is no torque present on the opposing side of the disconnect clutch 26 relative to the engine 14 since there is no torque being delivered from the M/G 18 to the drive wheels 42). A non-zero torque condition of the disconnect clutch 26 may referred to a condition where there is a current torque demand or where torque is being delivered to the drive wheels 42 (e.g., torque is present on the opposing side of the disconnect clutch 26 relative to the engine 14 since torque is being delivered from the M/G 18 to the drive wheels 42).

Zero torque conditions of the disconnect clutch 26 where the disconnect clutch 26 may be utilized to start the engine 14 may include (i) a cold engine start; (ii) a start while the transmission 24 is in a neutral gear; (iii) a start while the transmission 24 is in a parked gear; and (iv) an engine start in response to a turning a key to ON position or equivalent (e.g., remote start). The disconnect clutch 26 may utilized to start the engine 14 under such zero torque conditions while also under either a stoked condition or a non-stroked condition depending on a level of adaptive learning, which is further discussed below.

Non-zero torque conditions of the disconnect clutch 26 where the disconnect clutch 26 may be utilized to start the engine 14 may include engine starts where torque is also being delivered to the drive wheels 42 (e.g., via the M/G 18) under high driver torque demand conditions (e.g., wide open throttle) or low driver torque demand conditions such as (i) static torque conditions (e.g., a hill hold), (ii) creep conditions, or (iii) when the transmission 24 is in a high gear. The disconnect clutch 26 may be utilized to start the engine 14 under such non-zero torque conditions while also under either a stoked condition or a non-stroked condition depending on a level of adaptive learning, which is further discussed below.

The disconnect clutch 26 also be utilized to start the engine in certain circumstances where there is an urgency to start the engine 14 making such circumstances a priority regardless of the zero or non-zero torque condition of the disconnect clutch 26 and regardless of the stroked or non-stroked condition of the disconnect clutch 26. These circumstances where it is priority to start the engine 14 regardless of the other conditions may include a failure of the starter motor 62 or a scenario where the crankshaft 28 of the engine 14 is rotating even though the engine 14 has been shutdown. If the crankshaft 28 is still rotating, engaging the starter motor 62 could result in grinding, wearing, etc. of the gear teeth on the starter motor 62 and flywheel of the engine 14. Such a scenario where the crankshaft 28 may still be rotating even though engine has been shutdown may correspond to a change of mind scenario (e.g., a tip-out of the accelerator pedal 52 resulting in a command to shutdown the engine 14 followed by a tip-in of the accelerator pedal 14 resulting in a command to start the engine 14 before an engine speed (i.e., a crankshaft rotation speed) reaches zero.

Figure 2:
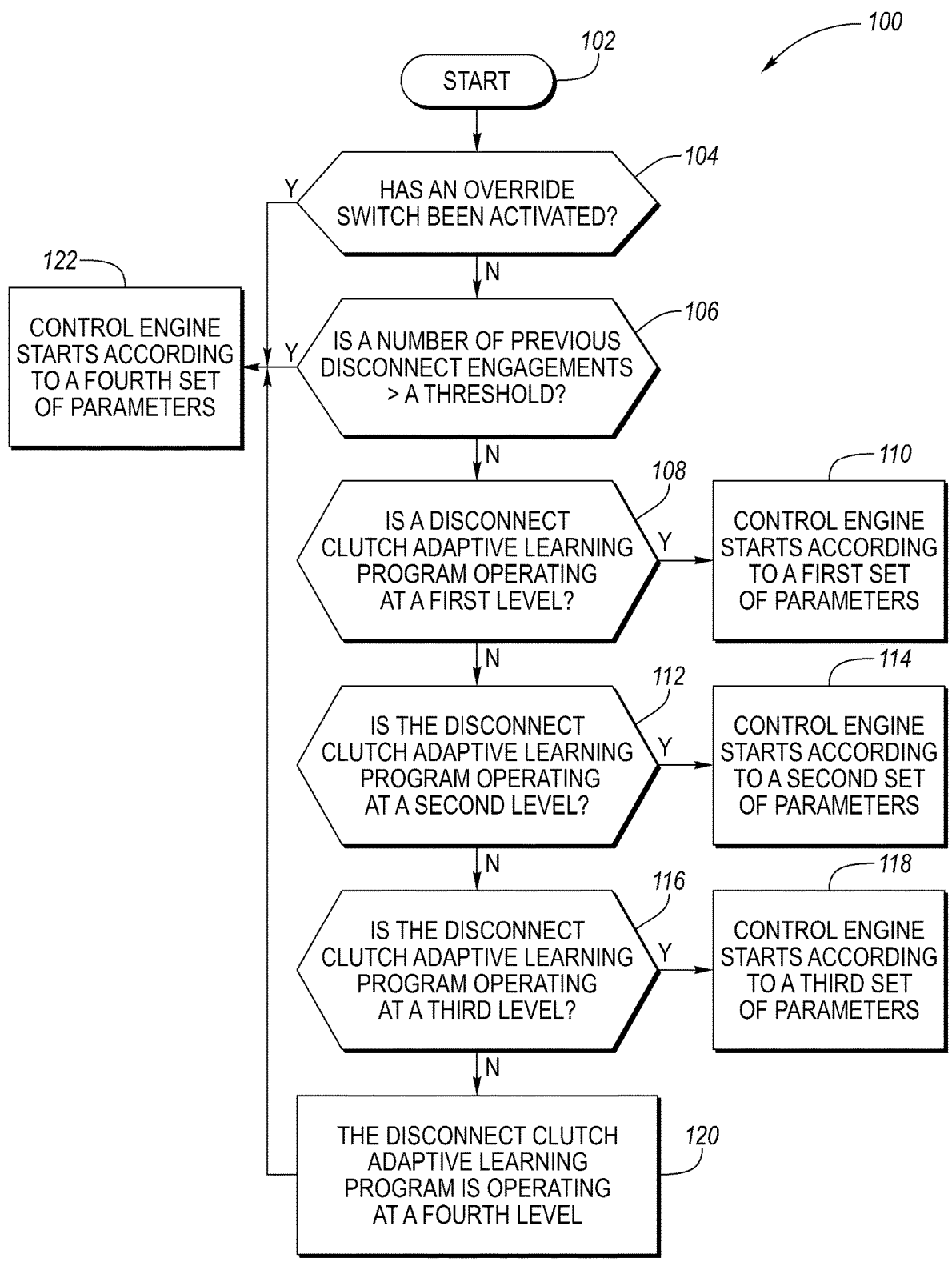
FIG. 2 is a flowchart illustrating a method for controlling engine starts.

Referring to FIG. 2, a flowchart of a method 100 for controlling engine starts is illustrated. The method 100 may be stored as control logic and/or an algorithm within one or more controllers (e.g., the PCU 50). The controller or controllers may implement the method 100 by controlling the various components of the vehicle 10. The method 100 begins at start block 102. Start block 102 may correspond to an engagement of a vehicle ignition or a "key on" condition that indicates an operator initiating a new drive cycle for operating the vehicle 10. Next, the method 100 moves on to block 104 where it is determined if an override switch has been activated. Such a switch may be located on a control panel, display screen, etc. within the vehicle 10. If the override switch has not been activated, the method 100 moves on to block 106 where it is determined if a number of previous engagements of the disconnect clutch 26 is greater than a threshold. The number of previous engagements may refer to all engagements of the disconnect clutch 26 or may only refer to engagements of the disconnect clutch 26 where the disconnect clutch 26 was being engaged to start the engine 14. If the number of previous engagements of the disconnect clutch 26 does not exceed the threshold, the method 100 moves on to block 108.

An adaptive learning program may be utilized to update control parameters for the disconnect clutch 26 over the life of the disconnect clutch 26 and in response to continued use of the disconnect clutch 26. The adaptive learning program may correspond to populating or updating values of various parameters of the disconnect clutch 26 during engagements of the disconnect clutch 26 that correspond to starting the engine 14 during various conditions and scenarios. For example, the adaptive learning program may be programmed to learn or adapt (i) a torque profile of the disconnect clutch relative to the hydraulic pressure of the disconnect clutch 26 to allow for a smooth engine start under the various conditions and scenarios; (ii) the stroke points of the disconnect clutch 26 under the various conditions and scenarios; (iii) boost times of the of the disconnect clutch 26 under the various conditions and scenarios; (iv) gain values that relate the hydraulic pressure of the disconnect clutch 26 to the torque capacity or the disconnect clutch 26 under the various conditions and scenarios (e.g., the gain value may be constant that relates the hydraulic pressure applied to the disconnect clutch 26 to the torque capacity of the disconnect clutch 26 according to a linear function); and (v) profiles of the electric current relative to the hydraulic pressure applied to the disconnect clutch 26 under the various conditions and scenarios, where the electric current corresponds to an electric current applied a solenoid that advances the hydraulic piston to engage the opposite sides of the disconnect clutch 26. The various conditions and scenarios may correspond to a temperature of the hydraulic fluid applied to the disconnect clutch 26, the pressure of the hydraulic fluid applied to the disconnect clutch 26, zero torque conditions of the disconnect clutch 26, non-zero torque conditions of the disconnect clutch 26, stroked conditions of the disconnect clutch 26, non-stroked conditions of the disconnect clutch 26, high priority scenarios (e.g., a failure of starter motor 62 or a change of mind scenario), etc.

At block 108, it is determined if the adaptive learning program is operating at a first level. The first level may refer to a first quantity of previous engagements of the disconnect clutch 26. The adaptive learning program may operate at the first level during a first period of operation. The first period of operation may correspond to an initial period after the vehicle 10 is initially put into use and the number of engagements of the disconnect clutch 26 is low (e.g., the first period of operation may include the first engagements of the disconnect clutch 26 after the vehicle 10 has been released from the factory). During this first period of operation, the adaptive learning program is learning the stroke points, the gain values, and the profiles of the electric current relative to the hydraulic pressure applied to the disconnect clutch 26 under the various conditions and scenarios.

The first level of adaptive learning may correspond to the adaptive learning program having learned zero or a portion of a plurality of stroke points associated with the disconnect clutch 26 during the engine starts under the various conditions and scenarios. More specifically, as the first level of the adaptive learning program progresses, the plurality of stroke points associated with the disconnect clutch 26 learned by the adaptive learning program may increase from zero, to a portion, to all of the stroke points of the disconnect clutch 26 under the various conditions and scenarios.

If the adaptive learning program is operating at a first level, the method 100 moves on to block 110 where the engine starts are controlled according to a first set of parameters. The first set of parameters may include closing the disconnect clutch 26 to start the engine 14 under a first set of conditions and operating the starter motor 62 to start the engine 14 under a second set of conditions. The first set of conditions may include (i) non-stroked and zero torque conditions of the disconnect clutch 26 and (ii) the high priority scenarios (e.g., a failure of starter motor 62 or a change of mind scenario). The second set of conditions may include (i) stroked and zero torque conditions of the disconnect clutch 26, (ii) non-stroked and non-zero torque conditions of the disconnect clutch 26, and (iii) stroked and non-zero torque conditions of the disconnect clutch 26.

If the adaptive learning program is not operating at the first level, the method 100 moves on to block 112 where it is it is determined if the adaptive learning program is operating at a second level. The second level may refer to a second quantity of previous engagements of the disconnect clutch 26 that is larger than the first quantity of previous engagements of the disconnect clutch 26. The adaptive learning program may operate at the second level during a second period of operation that occurs after the first period of operation. During this second period of operation, the adaptive learning program is learning the boost times of the disconnect clutch 26 during some of the various conditions and scenarios, which may be limited to scenarios including static and zero torque conditions of the disconnect clutch 26 (e.g., where there is no torque demanded or delivered to the drive wheels 42). The second level of adaptive learning may correspond to the adaptive learning program having learned (i) all of the plurality stroke points associated with the disconnect clutch 26 during the engine starts and (ii) zero or a first portion of a plurality of boosting times associated with the disconnect clutch 26 during the engine starts.

The first portion of a plurality of boosting times associated with the disconnect clutch 26 during the engine starts may correspond to some or all of the boosting times under static and zero torque conditions of the disconnect clutch 26. More specifically, as the second level of the adaptive learning program progresses, the first portion of a plurality of boosting times associated with the disconnect clutch 26 learned by the adaptive learning program may increase from zero, to a portion, to all of the boosting times of the disconnect clutch 26 under static and zero torque conditions of the disconnect clutch 26.

If the adaptive learning program is operating at a second level, the method 100 moves on to block 114 where the engine starts are controlled according to a second set of parameters. The second set of parameters may include closing the disconnect clutch 26 to start the engine 14 under the first set of conditions and a portion of the second set of conditions, and operating the starter motor 62 to start the engine 14 under a remainder of the second set of conditions. The first set of conditions and the portion of the second set of conditions at the second level may include (i) the non-stroked and zero torque conditions of the disconnect clutch 26, (ii) the stroked and zero torque conditions of the disconnect clutch 26, and (iii) the high priority scenarios (e.g., a failure of starter motor 62 or a change of mind scenario). The remainder of the second set of conditions at the second level may include (i) the non-stroked and non-zero torque conditions of the disconnect clutch 26 and (ii) the stroked and non-zero torque conditions of the disconnect clutch 26.

If the adaptive learning program is not operating at the second level, the method 100 moves on to block 116 where it is it is determined if the adaptive learning program is operating at a third level. The third level may refer to a third quantity of previous engagements of the disconnect clutch 26 that is larger than the second quantity of previous engagements of the disconnect clutch 26. The adaptive learning program may operate at the third level during a third period of operation that occurs after the second period of operation. During this third period of operation, the adaptive learning program is learning the boost times of the disconnect clutch 26 during some of the various scenarios, which may include high torque demand scenarios (e.g., wide open throttle conditions) and low torque demand scenarios (e.g., static torque conditions, creep conditions, or the transmission 24 being in a high gear). The third level of adaptive learning may correspond to the adaptive learning program having learned (i) all of the plurality stroke points associated with the disconnect clutch 26 during the engine starts and (ii) a second portion of the plurality of boosting times associated with the disconnect clutch 26 during the engine starts, wherein the second portion of the plurality of boosting times (i) includes and is greater than the first portion of plurality of boosting times and the (ii) the first portion of the plurality of boosting times now includes all of the boosting times under static and zero torque conditions of the disconnect clutch 26.

The second portion of a plurality of boosting times associated with the disconnect clutch 26 during the engine starts may correspond to some or all of the boosting times under low or high torque conditions of the disconnect clutch 26. More specifically, as the third level of the adaptive learning program progresses, the second portion of the plurality of boosting times associated with the disconnect clutch 26 learned by the adaptive learning program may increase from zero, to a portion, to all of the boosting times of the disconnect clutch 26 under low or high torque conditions of the disconnect clutch 26 plus the all of the boosting times under static and zero torque conditions of the disconnect clutch 26. The third level of adaptive learning may correspond to first learning the low torque demand scenarios followed by learning the high torque demand scenarios.

If the adaptive learning program is operating at a third level, the method 100 moves on to block 118 where the engine starts are controlled according to a third set of parameters. The third set of parameters may include closing the disconnect clutch 26 to start the engine 14 under the first set of conditions and a portion of the second set of conditions, and operating the starter motor 62 to start the engine 14 under a remainder of the second set of conditions. The portion and remainder of the second set of conditions may be different when the adaptive learning program is operating at a third level relative to the portion and remainder of the second set of conditions when the adaptive learning program was operating at the second level. The first set of conditions and the portion of the second set of conditions at the third level may include (i) the non-stroked and zero torque conditions of the disconnect clutch 26, (ii) the stroked and zero torque conditions of the disconnect clutch 26, (iii) a portion of the non-stroked and non-zero torque conditions of the disconnect clutch, (iv) a portion of the stroked and non-zero torque conditions of the disconnect clutch, and (v) the high priority scenarios (e.g., a failure of starter motor 62 or a change of mind scenario). The remainder of the second set of conditions at the third level may include (i) a remainder of the non-stroked and non-zero torque conditions of the disconnect clutch 26 and (ii) a remainder of the stroked and non-zero torque conditions of the disconnect clutch 26.

If the adaptive learning program is not operating at the third level, the method 100 moves on to block 120 where the adaptive learning program is operating at a fourth level. The fourth level may refer to a fourth quantity of previous engagements of the disconnect clutch 26 that is larger than the third quantity of previous engagements of the disconnect clutch 26. The adaptive learning program may operate at the fourth level during a fourth period of operation that occurs after the third period of operation. The fourth level of adaptive learning may correspond to the adaptive learning program having learned (i) all of the plurality stroke points associated with the disconnect clutch 26 during the engine starts and (ii) all of the plurality of boosting times associated with the disconnect clutch 26 during the engine starts.

The method 100 then moves on to block 122 where the engine starts are controlled according to a fourth set of parameters. The fourth set of parameters may include closing the disconnect clutch 26 to start the engine 14 under the first set of conditions and all of the second set of conditions. The first set of conditions and the second set of conditions may include (i) all of the non-stroked and zero torque conditions of the disconnect clutch 26, (ii) all of the stroked and zero torque conditions of the disconnect clutch 26, (iii) all of the non-stroked and non-zero torque conditions of the disconnect clutch, (iv) all of the stroked and non-zero torque conditions of the disconnect clutch, and (v) all of the high priority scenarios (e.g., a failure of starter motor 62 or a change of mind scenario). The method 100 also moves on to block 122 if the answer at block 104 is YES or if the answer at block 106 is YES.

It should be understood that the flowchart in FIG. 2 is for illustrative purposes only and that the method 100 should not be construed as limited to the flowchart in FIG. 2. Some of the steps of the method 100 may be rearranged while others may be omitted entirely.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   an engine and an electric machine each configured to generate power to propel the vehicle;
   a disconnect clutch disposed between the engine and the electric machine; and
   a controller programmed to,
      in response to (i) a command to start the engine and (ii) a first level of adaptive learning of previous disconnect clutch engagements, close the disconnect clutch to start the engine under non-stroked and zero torque conditions of the disconnect clutch, and
      in response to (i) the command to start the engine and (ii) a second level of adaptive learning of previous disconnect clutch engagements that is greater than the first level, close the disconnect clutch to start the engine under (a) the non-stroked and zero torque conditions of the disconnect clutch and (b) stroked and zero torque conditions of the disconnect clutch.

2. The vehicle of claim 1, wherein the controller is further programmed to, in response to (i) the command to start the engine and (ii) a third level of adaptive learning of previous disconnect clutch engagements that is greater than the second level, close the disconnect clutch to start the engine under (a) the non-stroked and zero torque conditions of the disconnect clutch, (b) the stroked and zero torque conditions of the disconnect clutch, (c) non-stroked and non-zero torque conditions of the disconnect clutch, and (d) stroked and non-zero torque conditions of the disconnect clutch.

3. The vehicle of claim 2, wherein the first level of adaptive learning corresponds to learning a portion of a plurality stroke points associated with the disconnect clutch during the engine starts.

4. The vehicle of claim 3, wherein the second level of adaptive learning corresponds to learning all of the plurality stroke points associated with the disconnect clutch during the engine starts and (ii) a portion of a plurality of boosting times associated with the disconnect clutch during the engine starts.

5. The vehicle of claim 4, wherein the third level of adaptive learning corresponds to learning all of a plurality stroke points associated with the disconnect clutch during the engine starts and (ii) all of a plurality of boosting times associated with the disconnect clutch during the engine starts.

6. The vehicle of claim 2 further comprising (i) drive wheels configured to receive power from the engine and electric machine to propel the vehicle and (ii) a transmission disposed between the engine and the drive wheels, and wherein the zero torque conditions correspond to the transmission being in a neutral gear or a parked gear.

7. The vehicle of claim 1 further comprising an accelerator pedal, and wherein the controller is further programmed to, in response to a tip-out of the accelerator pedal resulting in a command to shutdown the engine followed by a tip-in of the accelerator pedal resulting in a command to start the engine before an engine speed reaches zero during the shutdown, close the disconnect clutch to start the engine.

8. A vehicle comprising:
   an engine and an electric machine each configured to generate power to propel the vehicle;
   a disconnect clutch disposed between the engine and the electric machine;
   a starter motor configured to start the engine; and
   a controller programmed to,
      in response to commands to start the engine during a first period of operation, (i) close the disconnect clutch to start the engine under a first set of conditions and (ii) operate the starter motor to start the engine under a second set of conditions,
      in response to commands to start the engine during a second period of operation occurring after the first period of operation, (i) close the disconnect clutch to start the engine under the first set of conditions and a portion of the second set of conditions and (ii) operate the starter motor to start the engine under a remainder of the second set of conditions, and
      in response to commands to start the engine during a third period of operation occurring after the second period of operation, close the disconnect clutch to start the engine under the first set of conditions and the second set of conditions.

9. The vehicle of claim 8, wherein the first set of conditions includes non-stroked and zero torque conditions of the disconnect clutch.

10. The vehicle of claim 9, wherein the second set of conditions includes (i) stroked and zero torque conditions of the disconnect clutch, (ii) non-stroked and non-zero torque conditions of the disconnect clutch, and (iii) stroked and non-zero torque conditions of the disconnect clutch.

11. The vehicle of claim 10, wherein the portion of the second set of conditions to start the engine includes the stroked and zero torque conditions of the disconnect clutch.

12. The vehicle of claim 11 further comprising (i) drive wheels configured to receive power from the engine and electric motor to propel the vehicle and (ii) a transmission disposed between the engine and the drive wheels, and wherein the first set of conditions and the portion of the second set of conditions includes the transmission being in a neutral gear or a parked gear.

13. The vehicle of claim 11, wherein the remainder of the second set of conditions to start the engine includes (i) the non-stroked and non-zero torque conditions of the disconnect clutch and (ii) the stroked and non-zero torque conditions of the disconnect clutch.

14. The vehicle of claim 8 further comprising an accelerator pedal, and wherein the first set of conditions includes a tip-out of the accelerator pedal resulting in a command to shutdown the engine followed by a tip-in of the accelerator pedal resulting in a command to start the engine before an engine speed reaches zero during the shutdown.

15. The vehicle of claim 8, wherein the first set of conditions includes a failure of the of the starter motor.

16. A vehicle comprising:
   a powertrain having an engine and an electric machine each configured to generate power to propel the vehicle;
   a disconnect clutch (i) disposed between the engine and the electric machine, (ii) configured to open to disconnect the engine from a remainder of the powertrain, and (iii) configured to close to connect the engine to the remainder of the powertrain;
   a starter motor configured to start the engine; and
   a controller programmed to,
      in response to (i) a command to start the engine and (ii) a first level of adaptive learning of previous disconnect clutch engagements, (a) close the disconnect clutch to start the engine under non-stroked and zero torque conditions of the disconnect clutch, and (b) operate the starter motor to start the engine under (I) stroked and zero torque conditions of the disconnect clutch, (II) non-stroked and non-zero torque conditions of the disconnect clutch, and (III) stroked and non-zero torque conditions of the disconnect clutch,
      in response to (i) the command to start the engine and (ii) a second level of adaptive learning of previous disconnect clutch engagements that is greater than the first level, (a) close the disconnect clutch to start the engine under (I) the non-stroked and zero torque conditions of the disconnect clutch and (II) the stroked and zero torque conditions of the disconnect clutch, and (b) operate the starter motor to start the engine under (I) the non-stroked and non-zero torque conditions of the disconnect clutch and (II) the stroked and non-zero torque conditions of the disconnect clutch,
      in response to (i) the command to start the engine and (ii) a third level of adaptive learning of previous disconnect clutch engagements that is greater than the second level, (a) close the disconnect clutch to start the engine under (I) the non-stroked and zero torque conditions of the disconnect clutch, (II) the stroked and zero torque conditions of the disconnect clutch, (III) a portion of the non-stroked and non-zero torque conditions of the disconnect clutch, and (IV) a portion of the stroked and non-zero torque conditions of the disconnect clutch, and (b) operate the starter motor to start the engine under (I) a remainder of the non-stroked and non-zero torque conditions of the disconnect clutch and (II) a remainder of the stroked and non-zero torque conditions of the disconnect clutch, and
      in response to (i) the command to start the engine and (ii) a fourth level of adaptive learning of previous disconnect clutch engagements that is greater than the third level, close the disconnect clutch to start the engine under (I) the non-stroked and zero torque conditions of the disconnect clutch, (II) the stroked and zero torque conditions of the disconnect clutch, (III) the non-stroked and non-zero torque conditions of the disconnect clutch, and (IV) the stroked and non-zero torque conditions of the disconnect clutch.

17. The vehicle of claim 16, wherein the first level of adaptive learning corresponds to learning a portion of a plurality stroke points associated with the disconnect clutch during the engine starts.

18. The vehicle of claim 17, wherein the second level of adaptive learning corresponds to learning (i) all of the plurality stroke points associated with the disconnect clutch during the engine starts and (ii) a first portion of a plurality of boosting times associated with the disconnect clutch during the engine starts.

19. The vehicle of claim 18, wherein the third level of adaptive learning corresponds to learning (i) all of the plurality stroke points associated with the disconnect clutch during the engine starts and (ii) a second portion of the plurality of boosting times associated with the disconnect clutch during the engine starts, wherein the second portion of the plurality of boosting times includes and is greater than the first portion of plurality of boosting times.

20. The vehicle of claim 19, wherein the fourth level of adaptive learning corresponds to learning (i) all of the plurality stroke points associated with the disconnect clutch during the engine starts and (ii) all of the plurality of boosting times associated with the disconnect clutch during the engine starts.

* * * * *